(12) United States Patent
Webb

(10) Patent No.: US 6,207,052 B1
(45) Date of Patent: Mar. 27, 2001

(54) METHOD AND APPARATUS FOR REMOVING AIR LOCKS WITHIN MANUALLY OPERATED MICRO-FILTRATION DEVICES

(75) Inventor: Garth T. Webb, 18040 20th Avenue, White Rock, B.C. (CA), V4P 1M6

(73) Assignee: Garth T. Webb, White Rock (CA)

( * ) Notice: Subject to any disclaimer, the term of this patent is extended or adjusted under 35 U.S.C. 154(b) by 0 days.

(21) Appl. No.: 09/406,342

(22) Filed: Sep. 27, 1999

Related U.S. Application Data

(63) Continuation of application No. 09/108,152, filed on Jun. 30, 1998, now Pat. No. 6,019,899, which is a continuation-in-part of application No. 08/640,929, filed on Jul. 26, 1996, now Pat. No. 5,785,858.

(51) Int. Cl.[7] .................................................... B01D 63/08
(52) U.S. Cl. ............................. 210/321.75; 210/416.1; 210/416.3; 222/189.06; 222/200; 222/336; 222/189.9; 222/189.11; 422/101
(58) Field of Search ............................... 210/650, 321.75, 210/321.6, 416.1, 416.3, 117, 475, 321.84; 422/101; 222/189.9, 189.1, 189.2, 189.11, 189.06

(56) References Cited

U.S. PATENT DOCUMENTS

| 4,463,880 | 8/1984 | Kramer et al. . |
|---|---|---|
| 4,533,068 | 8/1985 | Meierhoefer . |
| 4,714,550 | 12/1987 | Malson et al. . |
| 4,938,389 | 7/1990 | Rossi et al. . |
| 4,940,542 | 7/1990 | Simizu et al. . |
| 5,120,438 | 6/1992 | Nakagawa et al. . |
| 5,130,015 | 7/1992 | Simizu et al. . |
| 5,785,858 | * 7/1998 | Webb .................................... 210/656 |
| 6,019,899 | 1/2000 | Webb . |

OTHER PUBLICATIONS

WO 92/04004 (Webb) Mar. 19, 1992.

* cited by examiner

*Primary Examiner*—Ana Fortuna
(74) *Attorney, Agent, or Firm*—Klarquist Sparkman Campbell Leigh & Whinston, LLP

(57) ABSTRACT

Currently microfiltration devices use hydrophillic membranes to sterilize liquids. Air locks may develop on the upstream side of the filter membrane within these apparatus. The present invention provides a method and apparatus for removing an air lock from the upstream side of a microfilter in a device for dispensing a sterile liquid from a storage container by forcing the liquid through a microfilter. The device comprises a first inlet passageway communicating between the storage container and a chamber on the upstream side of the filter closable by a first valve, a second outlet passageway communicating between the storage container and a chamber on the upstream side of the filter closable by a second valve, and the method comprises the steps of: a) creating a partial vacuum in the chamber upstream of the microfilter to thereby open the first valve and draw the liquid from the storage container through the first passageway into the chamber and into contact with the upstream side of the filter; b) closing the first and second valves and increasing the air pressure in the upstream chamber; and c) opening the second valve thereby releasing air under pressure from the upstream chamber through the second passageway.

11 Claims, 10 Drawing Sheets

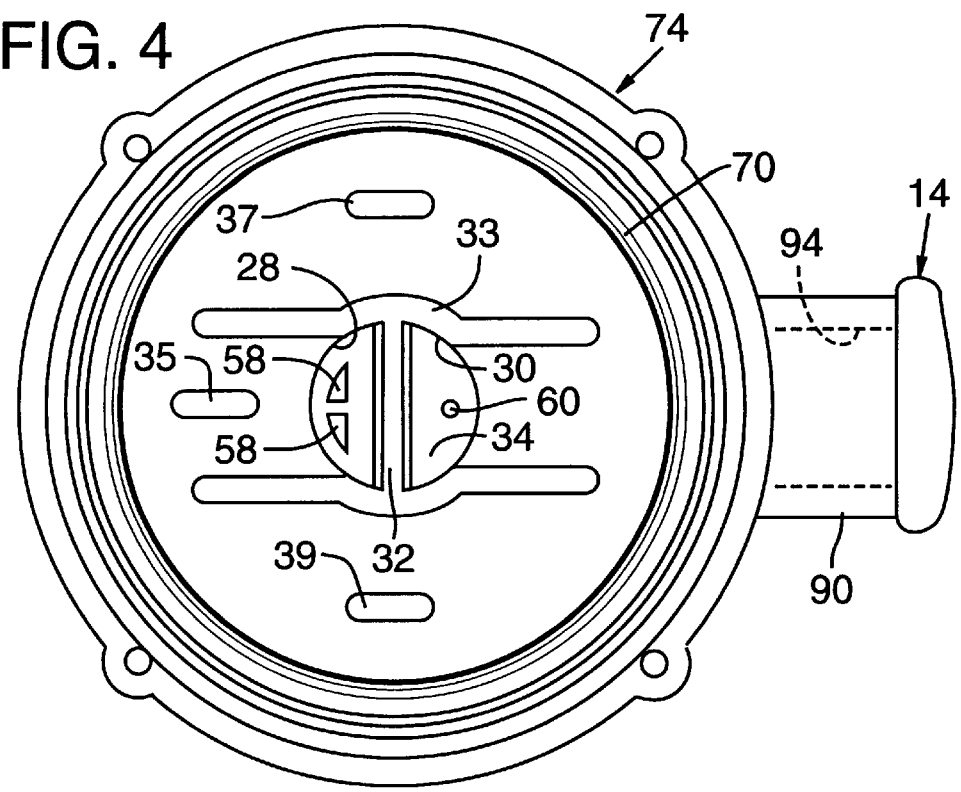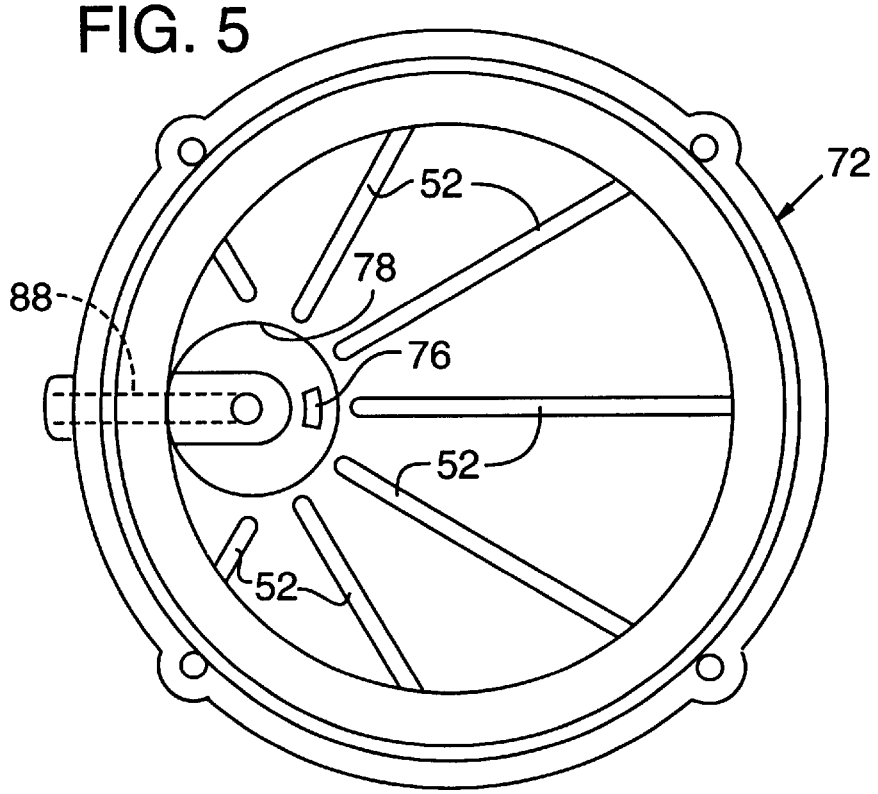

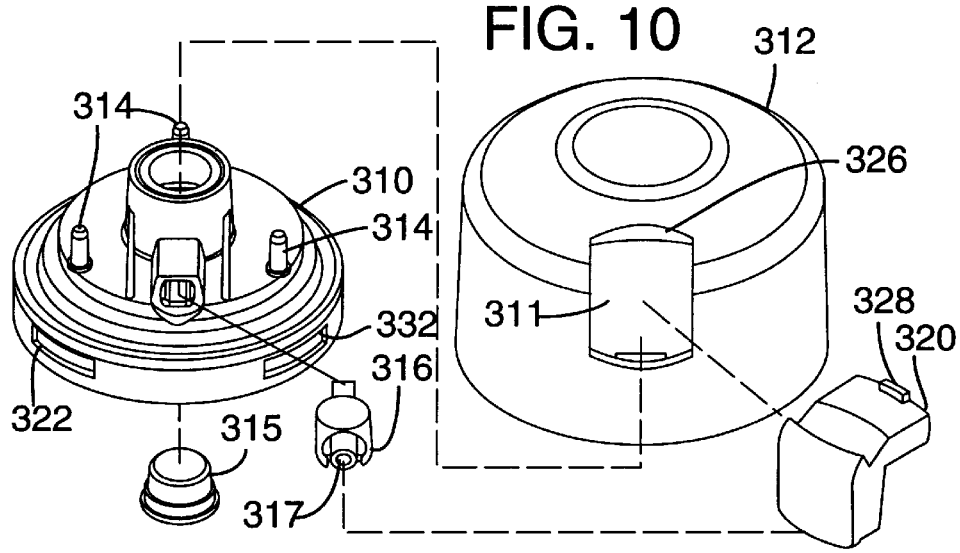
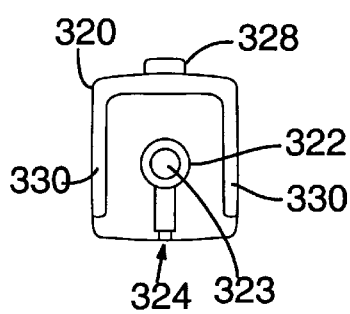
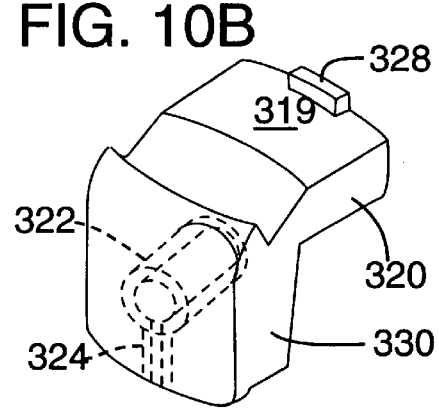
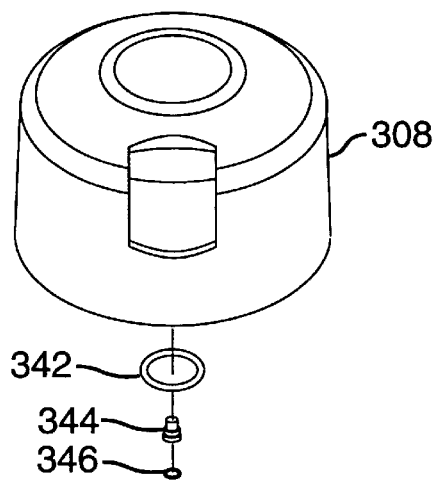
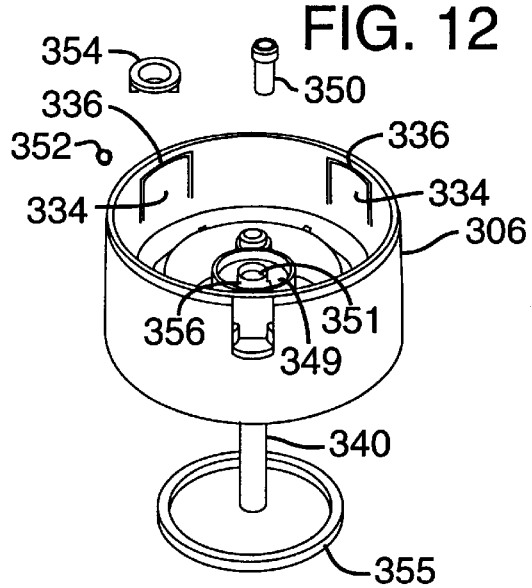

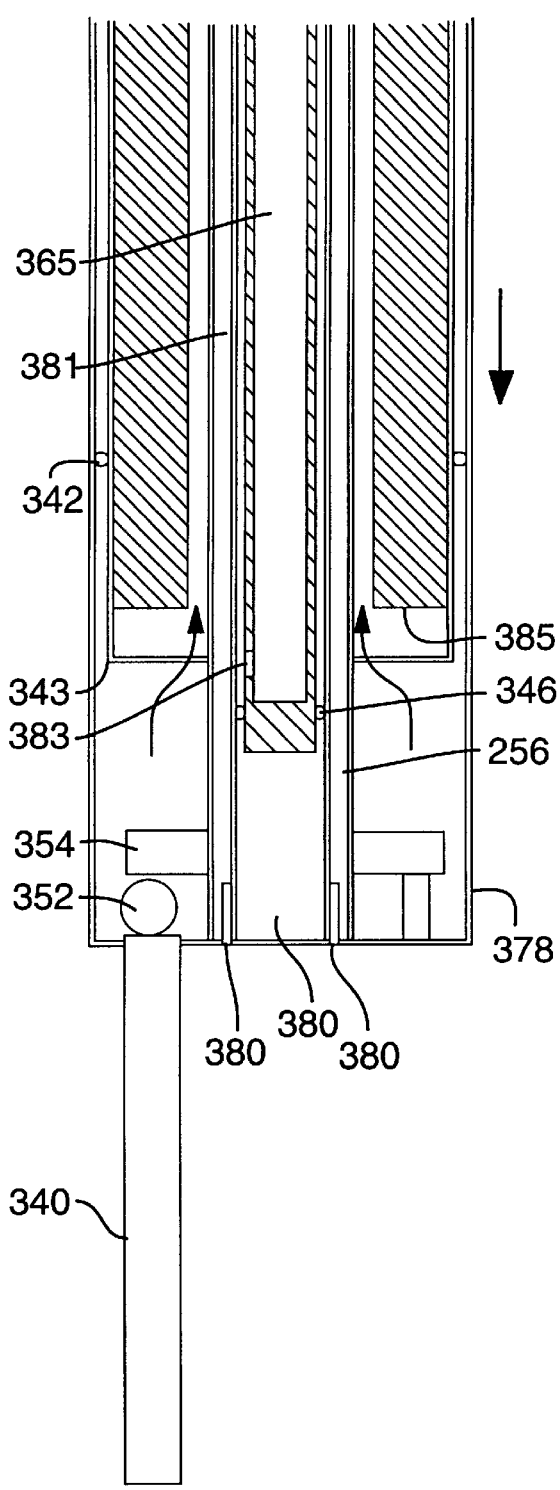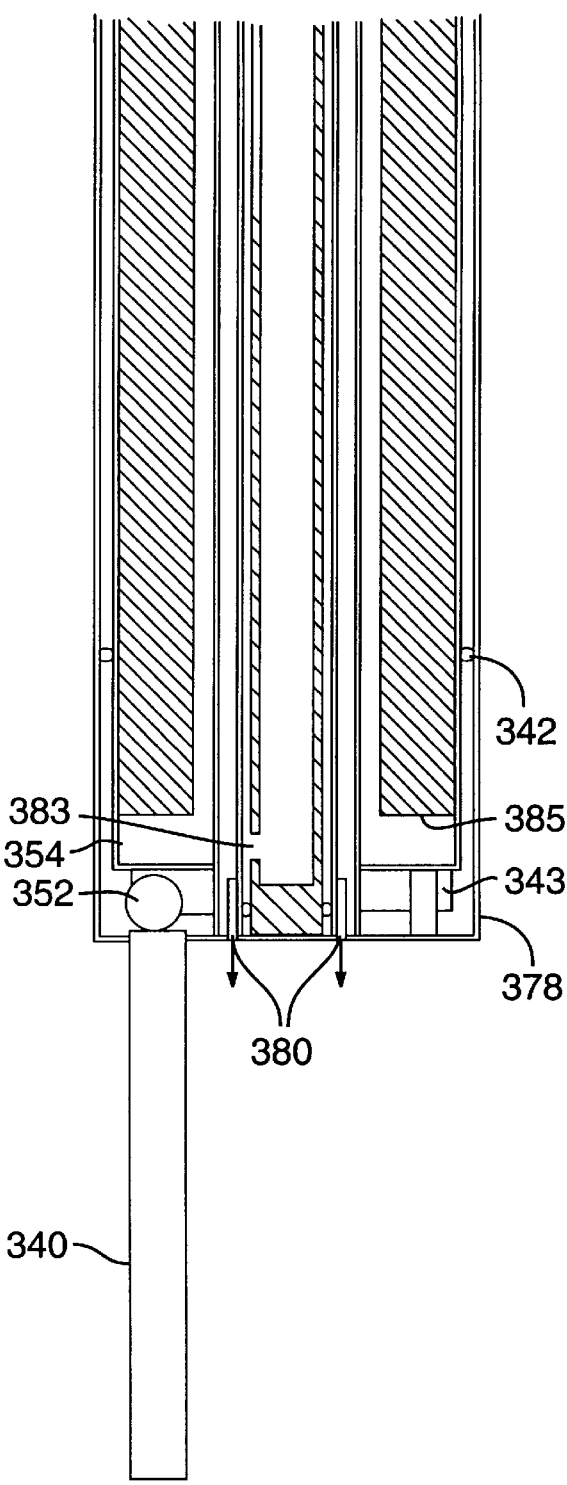

METHOD AND APPARATUS FOR REMOVING AIR LOCKS WITHIN MANUALLY OPERATED MICRO-FILTRATION DEVICES

CROSS-REFERENCE TO RELATED APPLICATIONS

This application is a continuation of application Ser. No. 09/108,152 filed Jun. 30, 1998, now U.S. Pat. No. 6,019,899 issued Feb. 1, 2000, which was a continuation-in-part of application Ser. No. 08/640,929 filed Jul. 26, 1996, now U.S. Pat. No. 5,785,858 issued Jul. 28, 1998.

TECHNICAL FIELD

The invention relates to microfiltration devices which use hydrophillic membranes to sterilize liquids, and more particularly to a method and apparatus for removing air locks which develop on the upstream side of the filter membrane within these apparatus.

BACKGROUND ART

Microfiltration is a commonly used for sterilizing liquids and gases. See for example the present inventor's device disclosed in International application no. PCT/CA91/00056, published Mar. 19, 1992 under no. WO 92/04004. In that device, a liquid sterilizing micro-filter is mounted on the outlet of a storage container to dispense sterile saline. A plunger is used to draw saline up from the container and force it through the microfilter, thereby sterilizing and dispensing the saline. A second micro-filter sterilizes the air which is drawn into the device to replace the ejected saline. Other prior art devices which employ hydrophillic membrane filters to sterilize liquids include those shown in applications no. GB 1,000,248; GB 2,106,877; and U.S. Pat. Nos. 4,938,389 and 4,533,068.

Within the microfiltration industry it is known that the integrity of a wetted microfilter membrane and its accompanying seals can be tested by pressurizing the upstream surface of the filter with air. The presence of air bubbles on the downstream side of the filter at relatively low air pressure indicates the presence of a leak either around the filter or through a defect within the membrane itself. The air pressure can be increased to a point where air is able to penetrate through the pores of the membrane. This is called the "bubble-point" test. It can be used to verify the pore size of the filter membrane, however, air-borne micro-organisms may also pass through the filter along with the air.

Once an integrity test has been conducted, the air on the upstream side of the filter remains trapped. This air could be pushed through the filter with liquid at pressures that exceed the "bubble point" pressure, but this may not be desirable for hand held filtering devices that are intended to deliver multiple unit doses of sterile liquid. The trapped air could also be removed from the upstream surface of the filter by inverting the entire device and allowing gravity to temporarily displace the air. This method may be valid but does entail certain technical disadvantages.

There is therefore a need for a mechanism that is capable of introducing and then removing air from the upstream surface of a hydrophillic filter membrane within a manually operated filtration device so that the operator may assure himself that the filter within the device if fully functional, without leaving an air lock on the filter.

DISCLOSURE OF INVENTION

The present invention provides a method and apparatus for removing an air lock from the upstream side of a microfilter in a device for dispensing a sterile liquid from a storage container by forcing the liquid through a microfilter, the device comprising a first inlet passageway communicating between the storage container and a chamber on the upstream side of the filter closable by a first valve, a second outlet passageway communicating between the storage container and the chamber on the upstream side of the filter closable by a second valve, the method comprising the steps of:

a) creating a partial vacuum in the chamber upstream of the microfilter to thereby open the first valve and draw the liquid from the storage container through the first passageway into the chamber and into contact with the upstream side of the filter;

b) closing the first and second valves and increasing the air pressure in the upstream chamber; and c) opening the second valve thereby releasing air under pressure from the upstream chamber through the second passageway.

BRIEF DESCRIPTION OF DRAWINGS

In drawings which illustrate a preferred embodiment of the invention;

FIG. 3 is a vertical cross-section of the device of FIG. 1 with the plunger pushed in;

FIG. 4 is a top plan view taken along lines 4—4 of FIG. 3 with the flap valve removed;

FIG. 5 is a bottom plan view taken along lines 5—5 of FIG. 3;

FIGS. 10A and 10B are an exploded perspective view of the filter assembly of the device of FIG. 7;

FIG. 11 is a perspective view of the filter assembly of the device of FIG. 7;

FIG. 12 is an exploded perspective view of the threaded housing assembly of the device of FIG. 7;

FIG. 17 is a cross-section of the piston in raised position; and

FIG. 18 is a cross-section of the piston at its lowest position.

BEST MODES FOR CARRYING OUT THE INVENTION

Figure 1:
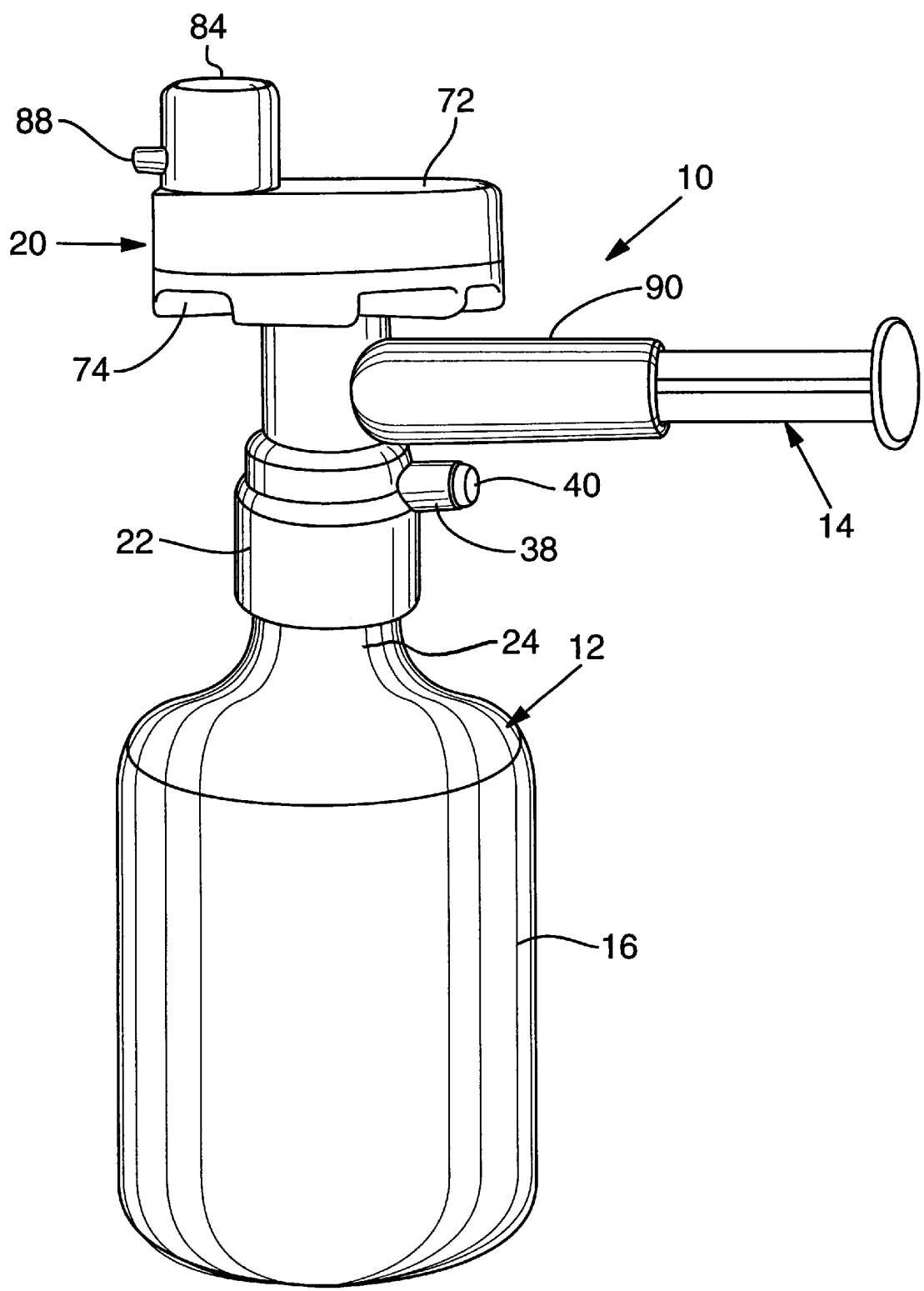
FIG. 1 is a perspective view of a device for dispensing sterile liquids.

FIG. 1 illustrates the device according to the present invention consisting of filter unit 10 and a hollow storage container 12. A plunger 14 is used to provide pressure to the liquid saline 16 to force it through a sterilizing filter 18. The filter housing 20, constructed of a rigid polycarbonate plastic, has an internally threaded neck 22 which screws onto externally threaded neck 24 of container 12. Filter housing 20 has a central cylindrical chamber 26, the upper portion of which is divided into two semi-cylindrical chambers 28, 30 by a central wall 32. The lower end of chambers 28, 30 is closed by a flap valve support 34 which has three openings 58, 60.

The lower end of housing 20 has a circular aperture 38 which is covered by a hydrophobic filter 40 which thus permits air to travel through it, but not water or other liquids. Air passing through filter 40 is sterilized. A flap valve could also function in replacement of filter 40. Notch 42 on stopper support 44 permits air to enter bottle 12 from the exterior of the container while preventing liquid from escaping. Support 44 has a central circular opening 46 with cross-ribs 48.

Semi-cylindrical chambers 28 and 30 are separated by vertical wall 32. Vertical wall 32 extends into barriers 33 (FIG. 4) leaving a passage around 33 for flow of liquid to occur along the upstream side of filter 18 from chamber 28 to 30 through chamber 54/56. Inserts 35, 37 and 39 provide support for the filter as well as spreading the liquid across the surface of the filter. Flap valve support 34 has three openings, two openings 58 extending from chamber 26 to chamber 28 and opening 60 extending from chamber 28 to chamber 30. Openings 58 are considerably greater in diameter than opening 60. Flap valve 62/64 is a unitary rubber flap consisting of two sections 62 and 64. Check valve 62 is a thin rubber flap valve with a thicker stop portion 63. Control valve 64 is similarly a rubber flap valve which is considerably thicker and therefore heavier than check valve 62. A protuberance 66 is provided at the end of piston 14 which extends through hole 68 to lift flap valve 64 at the end of the stroke of piston 14.

The upper end of chamber 54/56 is covered by hydrophillic filter 18. Filter 18 is held in place between upper filter unit housing section 72 and lower filter unit housing section 74 by filter support 50, which is a perforated plastic disk which sits in a cylindrical chamber formed between upper filter unit housing section 72 or and lower filter unit housing section 74, with a chamber 78 formed between filter support 50 and upper filter unit housing 72 and chamber 54/56 formed between filter support 50 and lower filter unit housing 74. Filter support 50 preferably has an array of large holes on its upper surface and a series of concentric ridges on its lower surface to provide uniform support to the filter. O-ring 70 seals the junction between upper and lower sections 72, 74. In this way liquid flowing up passageways 28 or 30 is forced through filter 18 rather than going around its edges. Ribs 52 hold filter support 50 in place and direct the flow of liquid to chamber 78. Passage 76 runs from chamber 78 to circular chamber 80 which is covered by a circular rubber membrane or diaphragm 82. Diaphragm 82 is secured at its outer edge by clamp piece 84 and is stretched across central cylindrical extension 86 through the centre of which runs passage 88 to the exterior of the housing. A vent 81 facilitates the movement of diaphragm 82.

Plunger 14 extends into hollow cylinder 90. Plunger 14 has attached at one end thereof a flexible silicone piston 92 which sealingly slides in cylinder 90. Passageway 68 extends from chamber 94 within cylinder 90 to chamber 30.

In operation, the integrity of the filter 18 is tested by determining whether any air is expelled from passageway 88 when the device is operated to force air against the upstream side of filter 18. If air is expelled in addition to the liquid, then there is a problem with the integrity of the filter. By testing the device in this way an air lock may be formed on the upstream side of filter 18, blocking the passage of liquid through filter 18. The air lock is removed by passing liquid under increased pressure across the lower surface of filter 18 and driving the air back into container 12. For example, withdrawal of plunger 14 creates a vacuum within chambers 28 and 30. The greater air pressure in container 12 than in chamber 28 therefore causes saline 16 to pass through chamber 26, through openings 62 and into chamber 28 around check valve 107, filling chamber 28 and passing into chamber 54. Flap valve 64 is not unseated due to its weight and the small size of aperture 60. The liquid flows from chamber 28 then around ridges 33 thereby spreading out across the upstream face of filter 18 thereby carrying air with it and down into chamber 30. Plunger 14 is then pressed inwardly to force check and control valves 62 and 64 against support 34, closing apertures 58, 60. Air remaining in chamber 30 is compressed. As plunger 14 reaches the end of its stroke, air pressure within chamber 30 is greatly increased until protuberance 66 lifts valve 64, allowing the pressurized air to squirt back to container 12. At the same time liquid flows out of chambers 28 and 30 into chambers 54, 56 thus replacing the air which had locked filter 18. Further pressure will then force saline through filter 18 opening diaphragm 82 and passageway 88 permitting the sterilized saline to be dispensed out of passageway 88. Filter 40 permits sterilized air to enter the bottle 12 through notch 42 to replace the ejected saline.

The present invention thus provides a device for removing air locks from a micro-filtration device that is attachable to a liquid storage container. The interior space is defined by the upstream surface of the filter 18 and the filter housing 72/74. The apparatus consists of three components that are in communication with the defined interior space. The first component is the inlet passage 26/28 with accompanying flap valve 62. This inlet passage allows a one-way flow of liquid and air from the attached storage container 12. The storage container, as described above, may be vented to allow ambient air to replace the liquid that is extracted from it.

The second component is plunger 14 that is fluid-tightly mounted within hollow cylinder 130. Preferably, the walls of cylinder 90 are an integral part of the filter housing. A collapsible accordion-like container could be substituted for the plunger arrangement.

The third component is outlet passage 60/26 and an related -control valve 64. This outlet passage leads liquid and air through a conduit back into the storage container. Such a conduit could be integrated within the filter housing so that it could be attached simultaneously with the filter housing to the storage container. The control valve 64 could be actuated either internally by the movement of the piston (protuberance 66), or externally by manual control.

The function of the plunger 14 is firstly to create a partial vacuum within the defined interior space. This is done by pulling the piston outwardly to increase the volume of the defined interior space. This partial vacuum draws liquid from the storage container 12 into the defined interior space, whether using a feed tube or by tilting the unit. The plunger 14 is then pushed inwardly, creating a positive pressure which acts to close the flap valve 62. Liquid will flow through the filter membrane 18 whereas air will not. Air trapped within the defined interior space will then be compressed by the positive pressure. The compressed air can be released only when the control valve 64 is opened. The control valve 64 may be opened by either an internally mounted mechanism attached to the piston, or by an externally mounted mechanism. Regardless of the type of mechanism used to open the control valve 64, once opened, the compressed air expands and exits out the outlet passage which would preferably lead back into the storage container, although it may exit to the exterior of the device.

Figure 3:
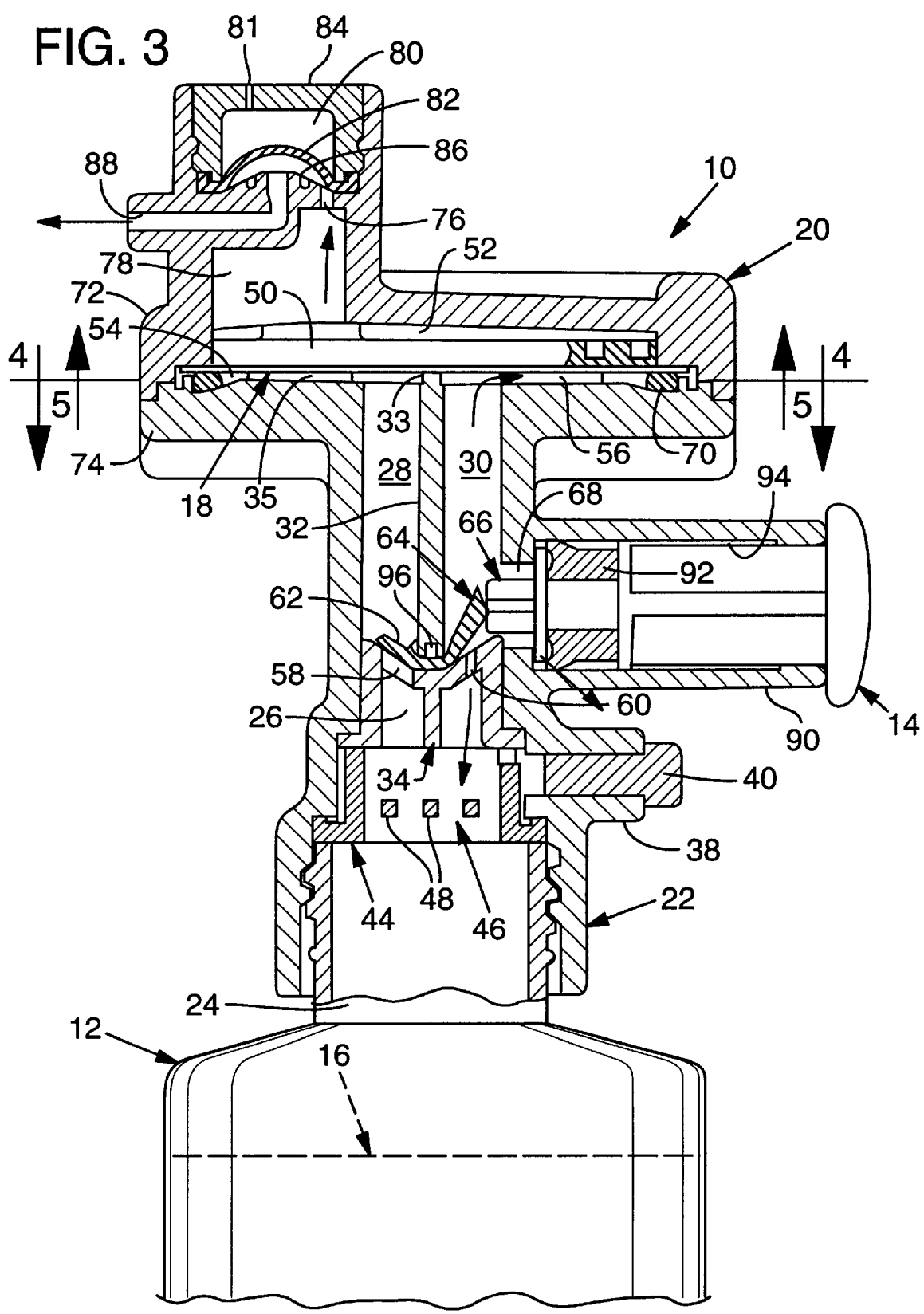
Figure 6:
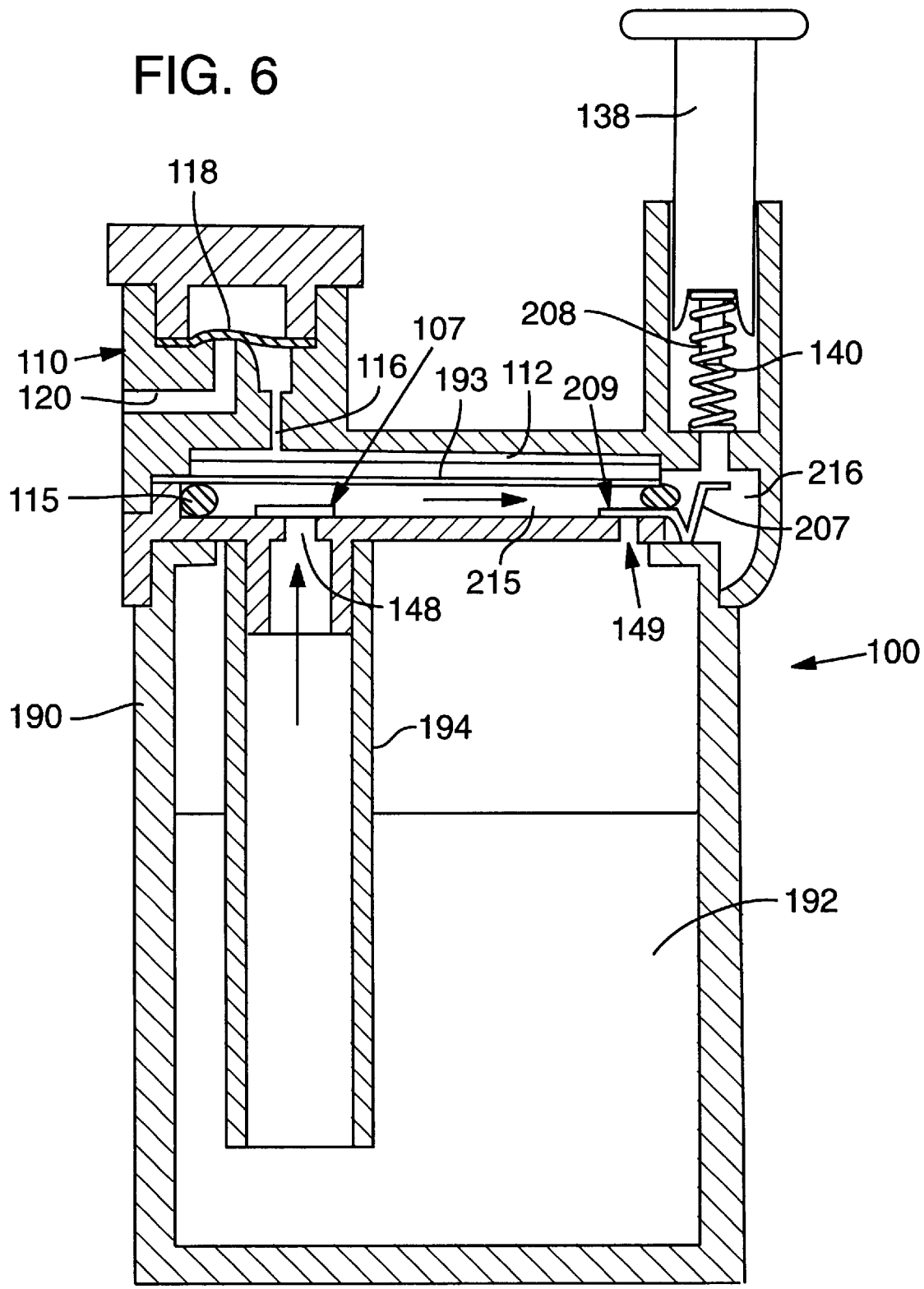
FIG. 6 is a vertical cross-section of a second embodiment of the invention.

A second embodiment of the device 100 is shown in FIG. 3. In this embodiment chamber 28 is collapsed to negligible height. The piston 138 applies pressure to chamber 216 which communicates with chamber 215. Protuberance 208 presses down on control arm 207 to lift one end of the valve 209 and open channel 149 at the end of the piston's stroke. A feed tube 194 is provided in this embodiment (the first embodiment would require tilting of the bottle to supply liquid to chamber 26). O-ring 115, filter support 193 (the filter is not shown), chamber 112, passage 116, valve 118 and passage 120 in upper housing 110 function as in the previous embodiment. Flap valve 107 operates to open and close passage 148 to permit the flow of saline 192.

A third embodiment of the device is shown as 300 in FIGS. 7 through 16. In this embodiment, a filter assembly 302 is threaded onto the threaded neck 303 of hollow storage container 304. The filter assembly 302 comprises a threaded housing 306, and the filter unit assembly 308. The filter unit assembly is shown in more detail in FIG. 10. It comprises the filter unit 310 and cap 312 which is secured to the filter unit 310 by friction fitting of three posts 314 into corresponding receiving tubes (not shown) on the underside of cap 312. A nozzle tube 316 is secured to the outlet channel 318 of filter unit 310. The main nozzle 320, shown from the rear in FIG. 10A, extends through opening 311 in cap 312. It has a cylinder 322 extending from the rear surface, shown in dotted outline in FIG. 10B, with a central bore 323 which is mounted on, and slides on, the central cylinder 317 of nozzle tube 316. Outlet port 324 communicates with the central bore 323 of cylinder 322 and thereby with the nozzle tube 316. The upper surface 319 of main nozzle 320 sides against the bottom surface of flange 326, and against the bottom surface of supporting ribs extending down from the lower inner surface of cap 312 (not shown). Tab 328 prevents main nozzle 320 from being completely withdrawn from opening 311 by bearing against flange 326. As further described below, when main nozzle 320 is extended, liquid can be ejected through outlet port 324, but when main nozzle 320 is retracted, the device is prevented from pumping out any liquid, since the lower edges of flanges 330 bear against the upper edge 331 of threaded housing 306 Retainer 315 in FIG. 10 is a retainer for the O-ring 342 on central piston 343 (FIG. 15) which seals the piston 343 within annular chamber 349 (FIG. 12). Off-center tube 340 shown in FIG. 12 and 15 extends into the lower end of annular chamber 349. FIG. 11 shows the placement of large central O-ring 342, small central O-ring 346 and the small center tube O-ring retainer 344.

Figure 16:
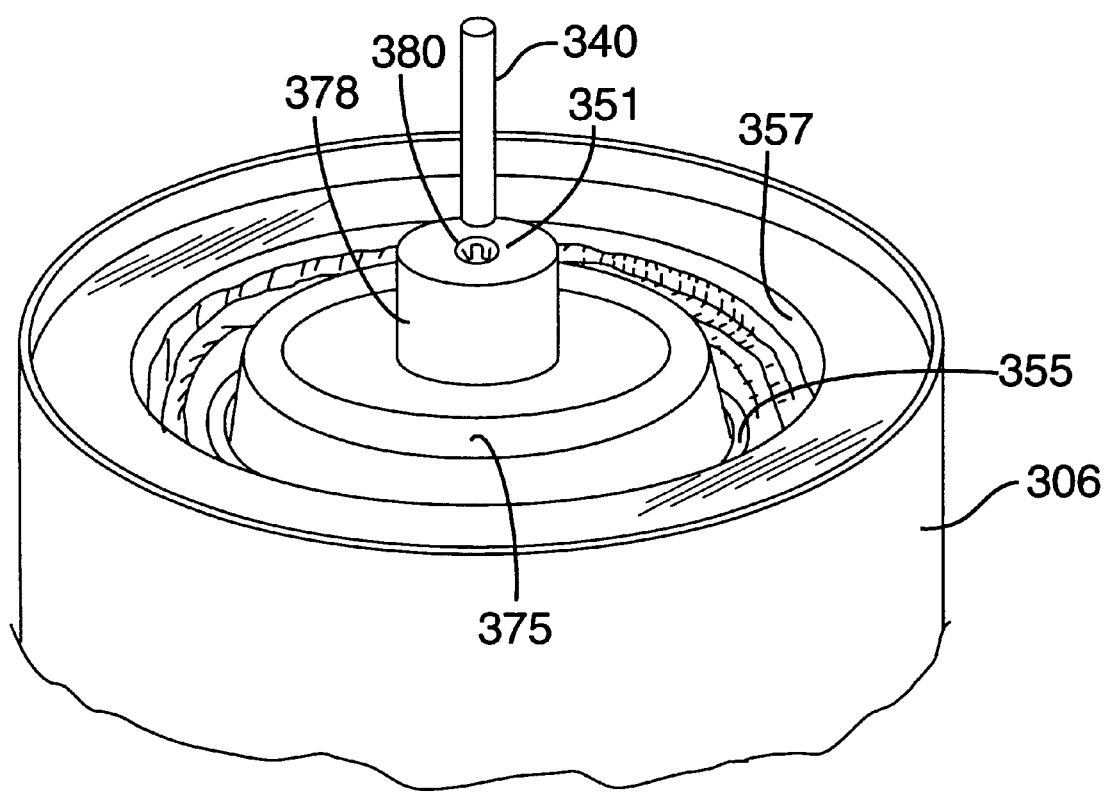
FIG. 16 is a perspective view from below of the threaded housing of the device of FIG. 7.

Referring to FIGS. 12 and 16, a small pin-hole aperture 375, which communicates with the air in the storage container 304, extends through the bottom of threaded assembly 306 into a cylindrical passage 348 which is closed by air filter 350. A steel ball valve 352 is provided to act as a valve seated in the opening of off-center tube 340 where it enters the annular chamber 349, off-center from central cylinder 356. The steel ball valve 352 is prevented from falling out by ball valve retainer 354, with enough clearance to permit it to be unseated from the opening to tube 340 when pressure in the tube exceeds that in the space above the steel ball. A sealing ring 355 is seated in the threaded aperture 357 in the underside of threaded housing 306 to seal against the top edge of the storage container 304. Central bore 351 extends through cylinder 356 and opens at the bottom of cylindrical extension 378. The inner surface of bore 351 has small rectangular cut-outs 380 adjacent the lower edge of the bore.

Figure 13:
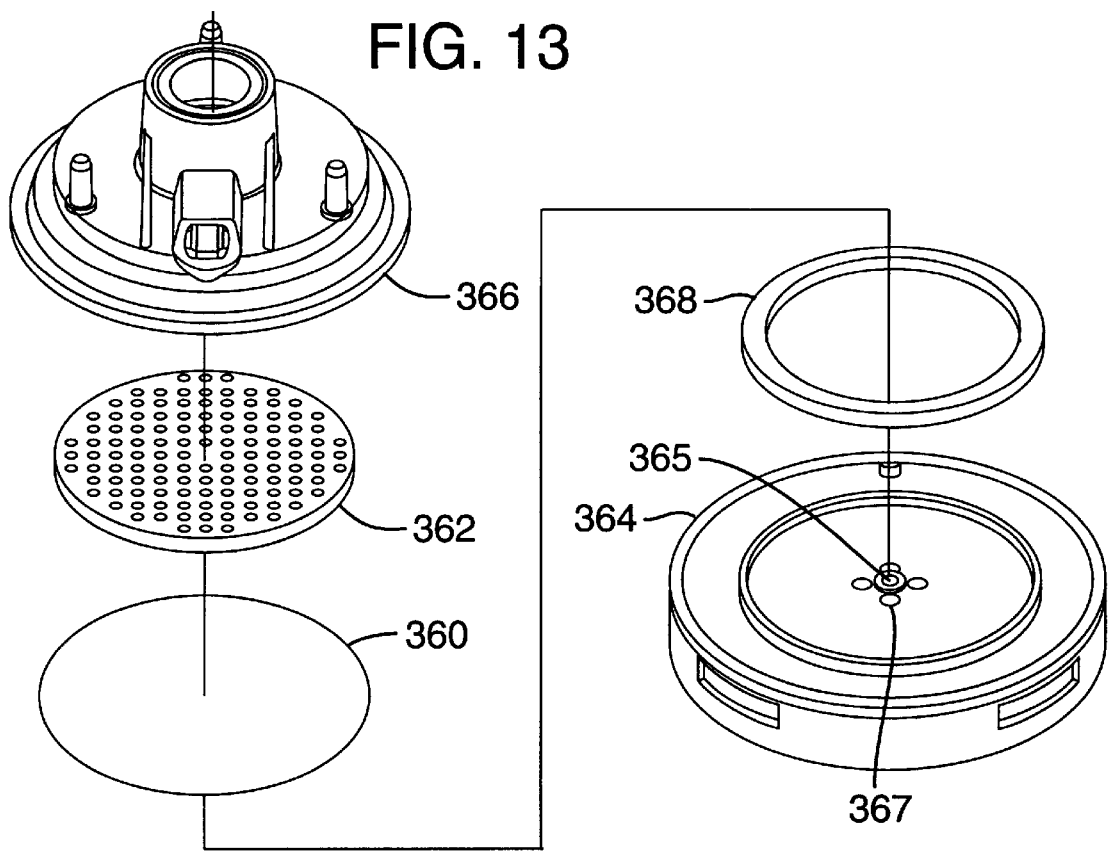
FIG. 13 is an exploded perspective view of the filter unit of the device of FIG. 7.

FIG. 13 illustrates the construction of the filter assembly. Filter paper 360 sits between perforated filter paper support 362 and lower filter housing 364. Upper filter unit 366 sits over the filter support in the lower filter housing, and filter unit seal 368 acts as a spacer between the filter 360 and the lower filter housing 364. Lower filter housing 364 has a central bore 365 which is surrounded by four perforations 367. Central bore 365 extends down a central post 381 and communicates with a small opening 383 adjacent the lower closed end of post 381. A shoulder 385 is provided in the interior and spaced from the end of piston 343.

Figure 14:
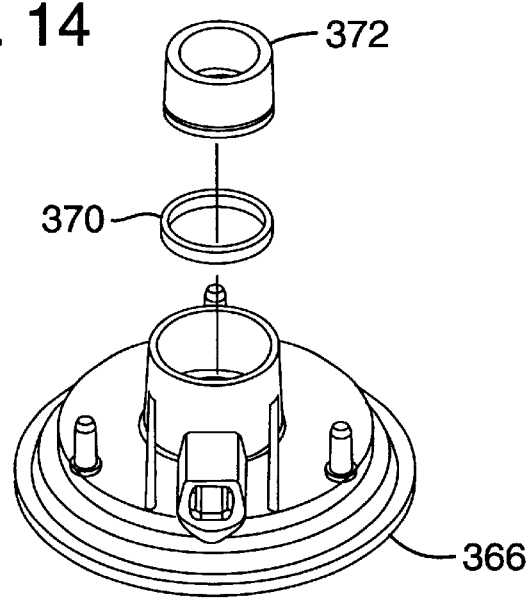
FIG. 14 is an exploded perspective view of the upper filter housing assembly of the device of FIG. 7.
Figure 15:
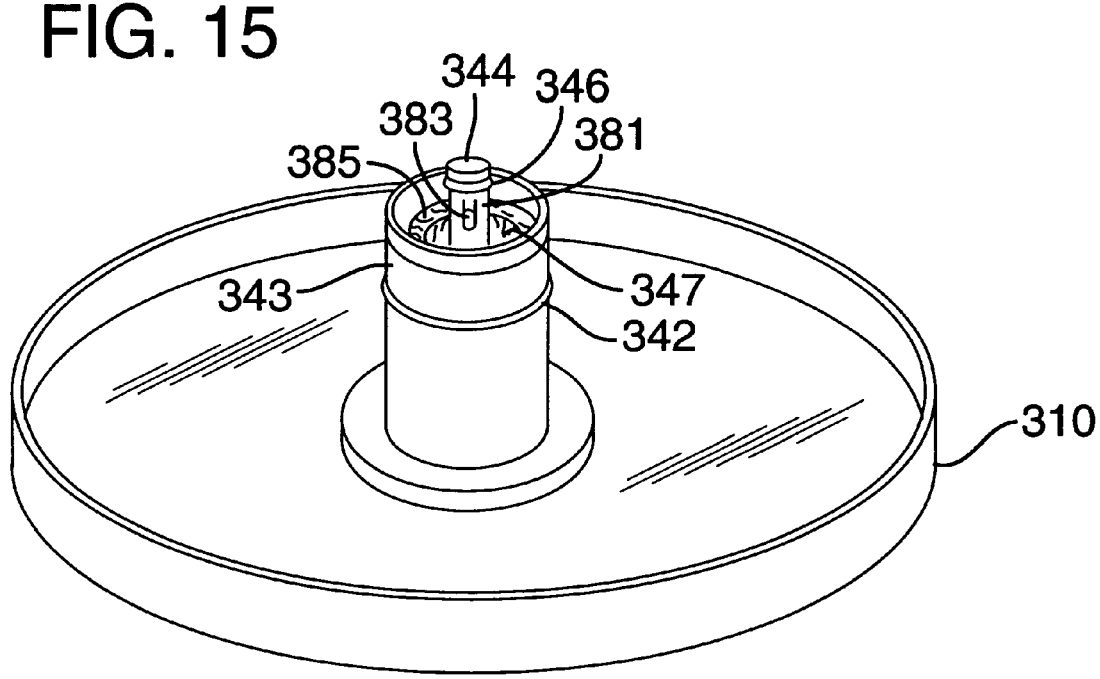
FIG. 15 is a perspective view from below of the filter unit of the device of FIG. 7.

As shown in FIG. 14, upper filter housing 366 comprises a membrane 370 and a membrane retainer 372. Membrane 370 and retainer 372 perform the same functions as diaphragm 82 and clamp piece 84 in the first embodiment noted above, to close the outlet passage from the outside air when no liquid is being expelled, and to permit the flow of liquid out the outlet passage when liquid is expelled under pressure. shown in FIG. 8, the filter unit 308 slides upwardly and downwardly in relation to threaded housing 306, biased upwardly by spring 307. As shown in FIG. 10, filter unit 310 has projections 332 on the outer circumference thereof which slide in channels 334 on the inner surface of threaded housing 306 (see FIG. 12), which have ridges 336 to limit the upward movement of the filter unit.

Figure 7:
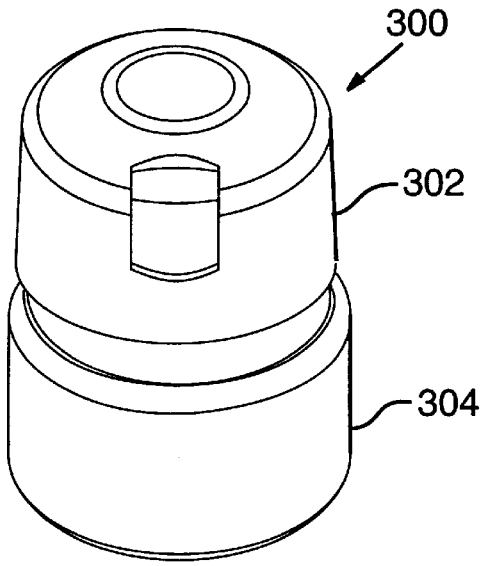
FIG. 7 is a perspective view of a third embodiment of a device for dispensing sterile liquids.
Figure 8:
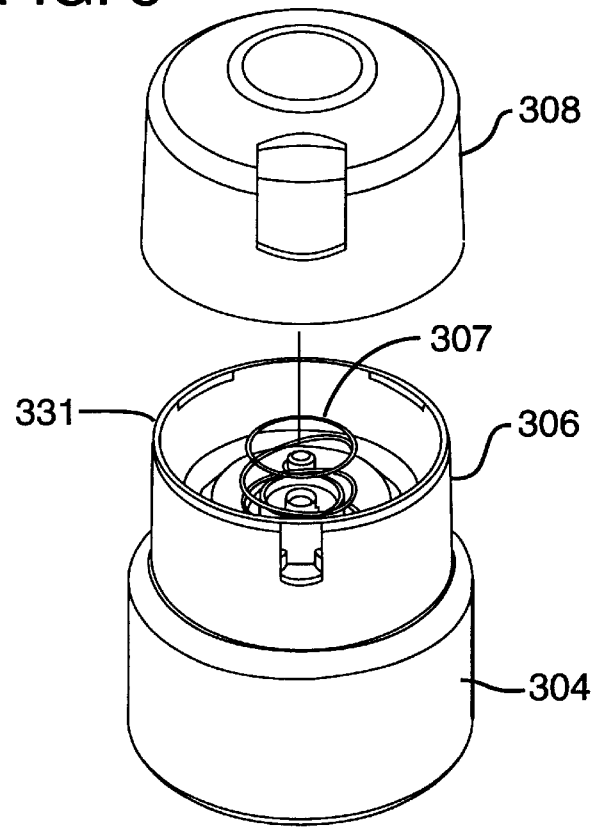
FIG. 8 is a perspective view of the device of FIG. 7 with the cap removed to illustrate the filter unit.
Figure 9:
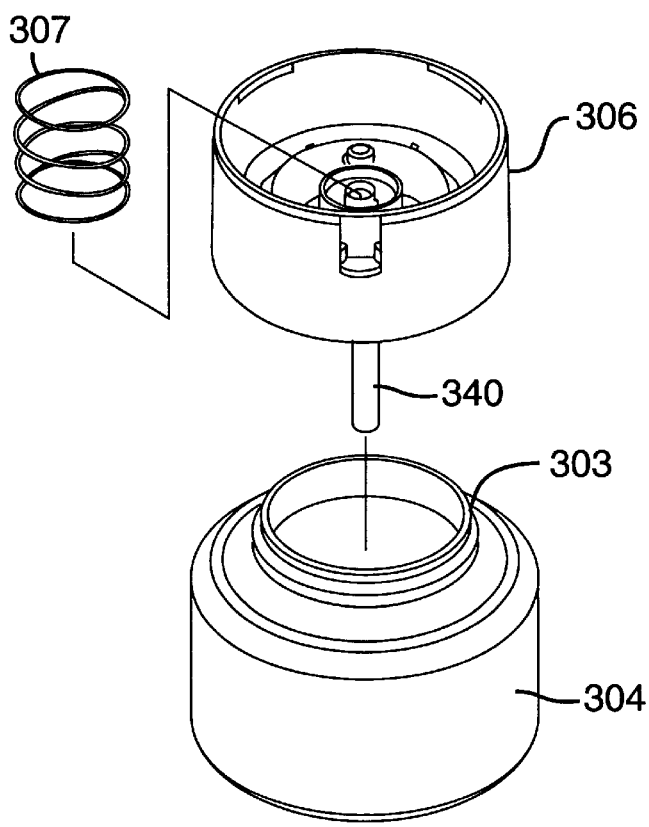
FIG. 9 is a perspective view of the device of FIG. 7 with the cap removed from the housing assembly, and the housing assembly separated from the bottle.

In operation of the embodiment shown in FIG. 7, the storage container 304 is filled with distilled or deionized water. A buffered salt tablet is added to the water in the storage container 304, and the filter assembly 302 is threaded onto the storage container 304. After the tablet has dissolved, the user pulls the main nozzle 320 out from opening 311, and presses downward on cap 310 several times, causing sterile saline solution to be expelled through outlet port 324 into the user's contact lens container, as follows. After the initial depression of cap 10, spring 307 causes the upper filter unit 308 to return to its upmost position, causing a partial vacuum in annular chamber 349. Steel ball valve 352 is unseated permitting liquid to flow from storage container 304 through tube 340 into annular chamber 349. When the filter housing 308 is again depressed, steel ball valve 352 is seated and seals the entrance to tube 340. The liquid in annular chamber 349 is then forced through central chamber 347 of piston 343, through holes 367 and through filter 360, and out outlet port 324. Some of the liquid is also forced from the top of holes 367 into bore 365 in central post 380, thereby clearing an air lock, and thence into central bore 351. That liquid in central bores 365 and 351 is retained under pressure in central bores 365 and 351 due to O-ring 346 until the O-ring 346 reaches, at the lower extremity of the pumping stroke, cut-outs 380 in the surface of central bore 351, and shoulder 385 contacts retainer 354, at which point the liquid under pressure in central bores 365 and 351 squirts back into the storage container 304.

To test the integrity of the filter, the storage container 304 is emptied and the unit is pumped several times. If no air exits from the nozzle, as indicated by a stationary droplet forming on the outlet port 324, then the user knows the filter is still integral. The storage container is then filled and a couple of pumps of liquid are made to clear any air lock before re-using. If however air exits from the outlet port 324, shown by bubbling or spitting, then the filter is damaged and the unit must be discarded and replaced.

Figure 2:
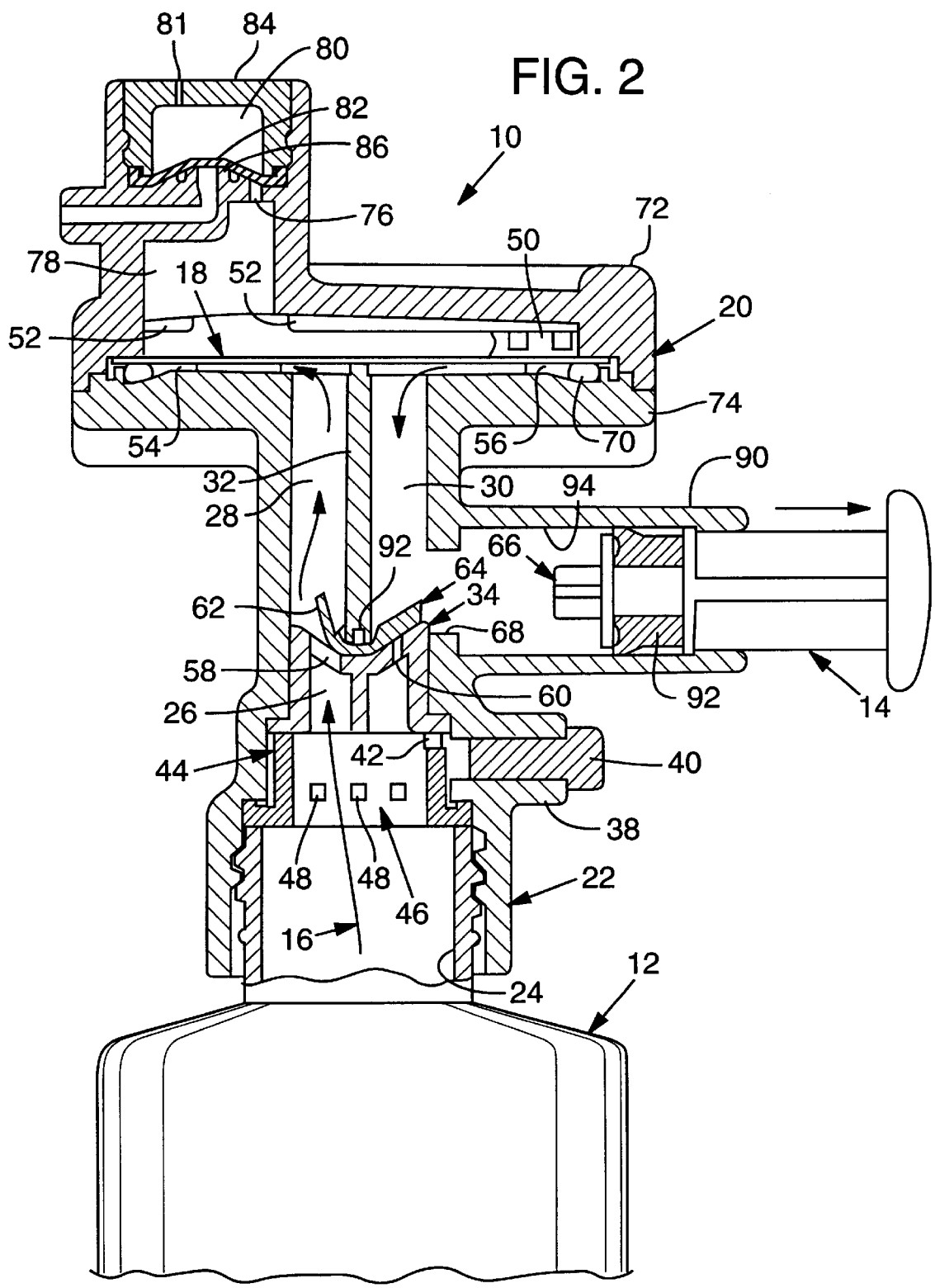
FIG. 2 is a vertical cross-section of the device of FIG. 1 with the plunger withdrawn.

The present invention may also be used to dispense medications by way of inhalation, using a vaporizing nozzle, in situations where the vaporized liquid should be sterile, for example the dispensing of insulin to diabetics. To achieve a vaporized spray, a standard vaporizing/atomizing/nebulizing nozzle of the type used to vaporize medicaments for application by inhalation, is substituted for the outlet port 324. The chamber downstream of filter support. 362 must be pressurized to provide adequate pressure for vaporization of the sterilized liquid. To achieve this a pump is provided, of the piston type shown as plunger 14, piston 92, cylinder 90 in FIGS. 1 through 3, except the outlet of cylinder 90 communicates with the chamber downstream of filter support 362. Alternatively a compressed gas cylinder could provide the necessary. A pressure release valve or control valve between the source of pressure and the vaporizing nozzle would be provided to control the release of liquid. For example, a manual release valve operated by the user could be provided to control the release of vaporized fluid. Alternatively a pressure release valve which opens when a minimum pressure is reached could be used in conjunction with a manual pump to release the vaporized liquid.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for storing and dispensing a sterile liquid capable of testing filter integrity and clearing of filter air locks comprising:
    a) a hollow storage container for storing said liquid;
    b) a housing removably sealably mounted on said hollow storage container comprising:
        i) an elongated hollow liquid-transporting extension having a lower inlet communicating with said hollow storage chamber when said housing is mounted on said hollow storage container and an upper outlet opening into said housing;
        ii) check valve means associated with said upper outlet of said elongated hollow liquid-transporting extension for alternately closing and opening said upper outlet and adapted to permit said liquid to flow from said hollow storage container through said upper outlet and prevent the flow of air or liquid into said hollow storage container through said upper outlet;
        iii) a first central chamber in said housing communicating with said upper outlet of said elongated hollow liquid-transporting extension;
        iv) a central bore opening at its lower end into said hollow storage container when said housing is mounted on said hollow storage container and having areas of increased diameter adjacent the lower end thereof; and
    c) a filter assembly mounted for upwardly-biased reciprocal motion on said housing and comprising:
        i) a filter support comprising a central opening and a plurality of centrally located apertures spaced from said central opening;
        ii) hollow cylindrical piston means extending downwardly from said upper filter assembly sealingly slidable within said first central chamber for increasing and reducing pressure in the interior of said first central chamber, and forming in the interior of said hollow cylindrical piston means a second central chamber having an upper outlet communicating with said spaced apertures in said filter support and communicating at its lower end with said first central chamber in said housing, and comprising a hollow central post closed across the lower end thereof and adapted to sealingly slide within said central bore of said housing, the hollow interior of said central post communicating at its upper end with said central opening in said filter support, said central post having sealing means adjacent the lower end thereof for sealing engagement with said central bore, and an aperture above said sealing means communicating with said hollow interior of said central post;
        iii) a liquid-sterilizing filter mounted in said filter assembly on said filter;
        iv) a liquid outlet downstream of said liquid-sterilizing filter;
        whereby said liquid is first drawn into said first central chamber from said hollow storage container through said elongated hollow liquid-transporting extension upon upward motion of said filter assembly, and then upon downward motion of said filter assembly a portion of said liquid is forced through said liquid-sterilizing filter and out said liquid outlet and a portion of said liquid is forced out said spaced apertures in said filter support, into said central opening in said filter support, down said central interior of said central post, and out said aperture in said central post above said sealing means, thereby returning into said hollow storage container when said aperture in said central post reaches said areas of increased diameter adjacent the lower end of said central bore of said housing.

2. The device of claim 1 wherein said housing is threadedly secured to said hollow storage container.

3. The device of claim 1 wherein said housing comprises a filter-covered opening communicating between the interior of said hollow storage container and the atmosphere.

4. The device of claim 1 wherein said check valve means for closing and opening said upper outlet is a ball valve retained by a valve retaining element.

5. The device of claim 1 wherein said filter assembly comprises a cap secured on said filter unit.

6. The device of claim 5 wherein said liquid outlet comprises a nozzle slidable on said filter unit between an extended position in which said nozzle extends beyond said cap, and a retracted position wherein said nozzle prevents reciprocal motion of said filter assembly on said housing.

7. The device of claim 1 further comprising a one-way valve associated with said liquid outlet for permitting the expulsion of liquid from said liquid outlet and preventing the intake of air into said sterilizing filter.

8. The device of claim 1 wherein said outlet comprises a vaporizer.

9. The device of claim 8 further comprising means for pressurising said liquid downstream of said filter.

10. The device of claim 9 wherein said means for pressurising said liquid downstream of said filter comprises a pump.

11. The device of claim 9 wherein said means for pressurising said liquid downstream of said filter comprises a cylinder of compressed gas.

* * * * *